(12) United States Patent
Kumar et al.

(10) Patent No.: US 7,359,816 B2
(45) Date of Patent: Apr. 15, 2008

(54) SENSOR CALIBRATION METHOD AND APPARATUS

(75) Inventors: Vineet Kumar, Wakefield, MA (US); Harvey Weinberg, Sharon, MA (US); William Giudice, Newton, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 11/440,495

(22) Filed: May 25, 2006

(65) Prior Publication Data

US 2006/0271320 A1    Nov. 30, 2006

Related U.S. Application Data

(60) Provisional application No. 60/684,293, filed on May 25, 2005.

(51) Int. Cl.
G06F 19/00 (2006.01)
(52) U.S. Cl. .......................................... 702/87; 702/85
(58) Field of Classification Search ................. 702/85, 702/87
See application file for complete search history.

(56) References Cited

U.S. PATENT DOCUMENTS 5,939,633 A    8/1999  Judy ........................ 73/514.32

6,505,511 B1    1/2003  Geen et al. ............... 73/504.12
6,959,240 B2 *  10/2005  Okamoto ..................... 701/70
2006/0080006 A1 *  4/2006  Bidou et al. .................... 701/1

FOREIGN PATENT DOCUMENTS

JP    2005-308531    *  4/2005

OTHER PUBLICATIONS

Ying Kun Peng; Golnaraghi, M; "A Vector-Based Gyro-Free Inertial Navigation System by Integrating Existing Network in a Passenger Vehicle"; Position Location and Navigation Symposium; Apr. 26-29, 2004; pp. 234-242.*
Weinberg et al., Title: Method and Apparatus for Controlling a Portable Device; Filed: May 5, 2006.

* cited by examiner

*Primary Examiner*—John Barlow
*Assistant Examiner*—Douglas N Washburn
(74) *Attorney, Agent, or Firm*—Bromberg & Sunstein LLP (57) ABSTRACT

A calibration system for an inertial sensor includes a calibration module for processing an output value produced by the inertial sensor, the output value related to a detected movement of an object, wherein the calibration module calculates an offset value from a plurality of output values, and memory operatively coupled with the calibration module, the memory capable of storing the plurality of output values and/or the offset value, wherein the inertial sensor is calibrated using the calculated offset value.

17 Claims, 5 Drawing Sheets

SENSOR CALIBRATION METHOD AND APPARATUS

CROSS-REFERENCE TO RELATED APPLICATIONS

This patent application claims priority under 35 U.S.C. § 119(e) to U.S. Provisional Patent Application No. 60/684,293 filed May 25, 2005, entitled SENSOR CALIBRATION METHOD AND APPARATUS, the disclosure of which is incorporated by reference herein in its entirety.

FIELD OF THE INVENTION

The invention generally relates to sensors and, more particularly, the invention relates to calibration of inertial sensors.

BACKGROUND OF THE INVENTION

A variety of different applications use sensor systems to detect the movement of an underlying object. For example, inertial sensors, e.g., accelerometers or gyroscopes, are used in safety and navigation systems for automotive, military, aerospace and marine applications. In automotive safety systems, inertial sensors are often mounted about the periphery of an automobile chassis to sense pre-specified accelerations or rotations. The sensors typically cooperate with a central computer that both coordinates their function and responds to pre-specified types of detected movement.

Upon detection of a pre-specified type of movement, the sensors transmit motion data to the computer, which causes systems within the automobile to respond in a pre-specified manner. For example, if the sensors detect a sudden and high deceleration, air-bag systems may deploy their air bags. Alternatively, if the sensors detect a sudden rotation, e.g., the automobile is swerving, breaking systems may selectively break to avoid a rollover. Accordingly, sensors have become critical in safety systems.

To operate properly, sensor systems require accurate calibration of the sensor null output, i.e., the sensor reading when the sensor is not moving. Specifically, sensor systems typically use the sensor null output value as an offset value to the sensor reading to accurately determine the environmental parameter being measured, e.g., angular movement. It is desirable to implement safety systems with affordable sensors so that safety improvements may be made more widely available. However, low cost sensors often have undesirable long-term drift of the sensor null value, which can invalidate the factory calibration settings for the sensor. In other words, long-term drift can corrupt the ultimate readings of the sensor, making the sensor less accurate over time.

SUMMARY OF THE INVENTION

In accordance with one aspect of the invention, a method of processing the offset in an inertial sensor having an output includes receiving a sensor output value from the inertial sensor and receiving a prior offset value. A new offset value is calculated using the received sensor output value and the prior offset value. The inertial sensor is calibrated using the new offset value.

In accordance with a related embodiment, the prior offset value may be received from a memory device. The sensor output value received may be a plurality of sensor output values over a length of time, and a new offset value may be calculated using the received plurality of sensor output values. The plurality of sensor output values may be received during a periodic period of time. The method may further include discarding the sensor output value if the sensor output value is outside of a predetermined range of values so that the discarded sensor output value is not used in calculating the new offset value. An average may be calculated using the received sensor output value and the prior offset value. The average may be a weighted average using the received sensor output value and the prior offset value. The inertial sensor may be coupled to an object and the sensor output value may be related to a detected movement of the object. The method may further include determining when the object is not moving, and the sensor output value from the inertial sensor may be received when the object is not moving. The method may further include notifying a user of the object if the new offset value is outside of a predetermined range of values. The inertial sensor may be coupled to an automobile and the sensor system may be calibrated when the automobile is turned on.

In accordance with another aspect of the invention, a calibration system for an inertial sensor includes a calibration module for processing an output value produced by the inertial sensor, the output value related to a detected movement of an object, and the calibration module may calculate an offset value from a plurality of output values. The calibration system further includes memory operatively coupled with the calibration module, the memory capable of storing the plurality of output values and/or the offset value, and the inertial sensor may be calibrated using the calculated offset value.

In accordance with a related embodiment, the calibration module may further include a filter configured to discard the output value if the output value is outside of a predetermined range of values so that the discarded output value is not used in calculating the offset value. The calibration module may further include a comparator to compare the output value from the inertial sensor to the offset value stored in the memory. The calibration module may further include a comparator to compare the offset value stored in memory with a default offset value. The calibration module may select the plurality of output values used for calculating the offset value when the object is not moving.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

In illustrative embodiments, a method and apparatus calibrate an inertial sensor system by calculating a new offset value using sensor output values and prior calculated offset values. The sensor output values may be received when the sensor system is moving and/or not moving. Among other ways, the offset value calculation may use an average or a weighted average of the sensor output values. Various embodiments apply to sensor systems in a wide variety of applications. For illustrative purposes, a sensor system in an automobile is discussed in detail below. It will be apparent to those skilled in the art, however, that sensor systems in other applications may be used with various embodiments of the present invention. Details of illustrative embodiments are discussed below.

Figure 1:
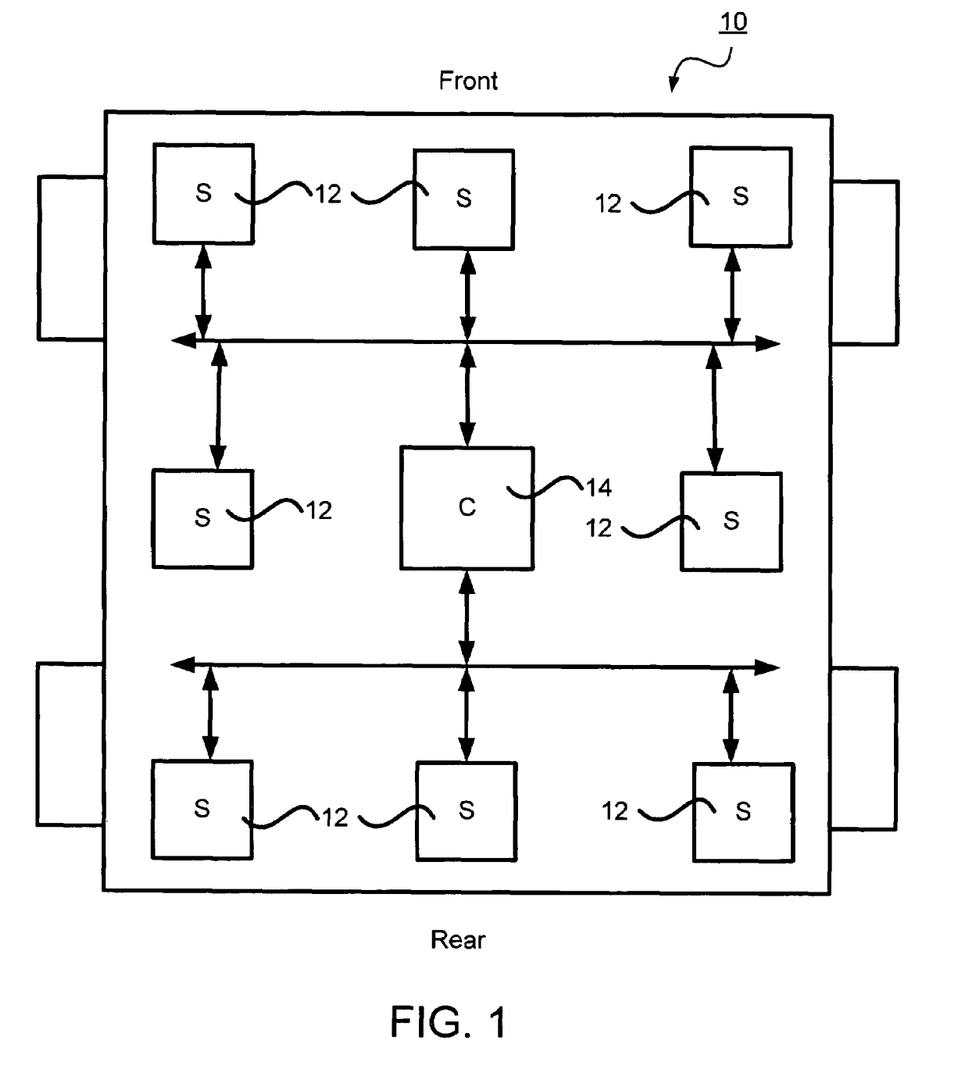
FIG. 1 schematically shows a sensor system that may implement one or more sensor calibration systems according to illustrative embodiments of the invention.

FIG. 1 schematically shows a sensor system that may implement one or more sensor calibration systems according to illustrative embodiments of the invention. More particularly, the sensor system shown senses or detects movement of an object 10, such as an automobile. The sensor system may include, among other things, a plurality of inertial sensors 12 that communicate with a central computer 14 through some interconnection medium.

The inertial sensors 12 may be formed using micromachining processes and may include micro-electromechanical systems (MEMS) devices, such as one or more MEMS accelerometers and/or MEMS gyroscopes. Accelerometers typically detect linear acceleration, while gyroscopes typically detect rotational movement of an object. Exemplary MEMS accelerometers are discussed in greater detail in U.S. Pat. No. 5,939,633, which is assigned to Analog Devices, Inc. of Norwood, Mass. Exemplary MEMS gyroscopes are discussed in greater detail in U.S. Pat. No. 6,505,511, which also is assigned to Analog Devices, Inc. The disclosures of U.S. Pat. Nos. 5,939,633 and 6,505,511 are incorporated herein by reference, in their entirety.

Although inertial sensors 12 are discussed above, principles of illustrative embodiments may apply to other sensor devices, such as MEMS pressure sensors and MEMS microphones. Accordingly, discussion of inertial sensors is exemplary and not intended to limit the scope of various embodiments of the invention.

Figure 2:
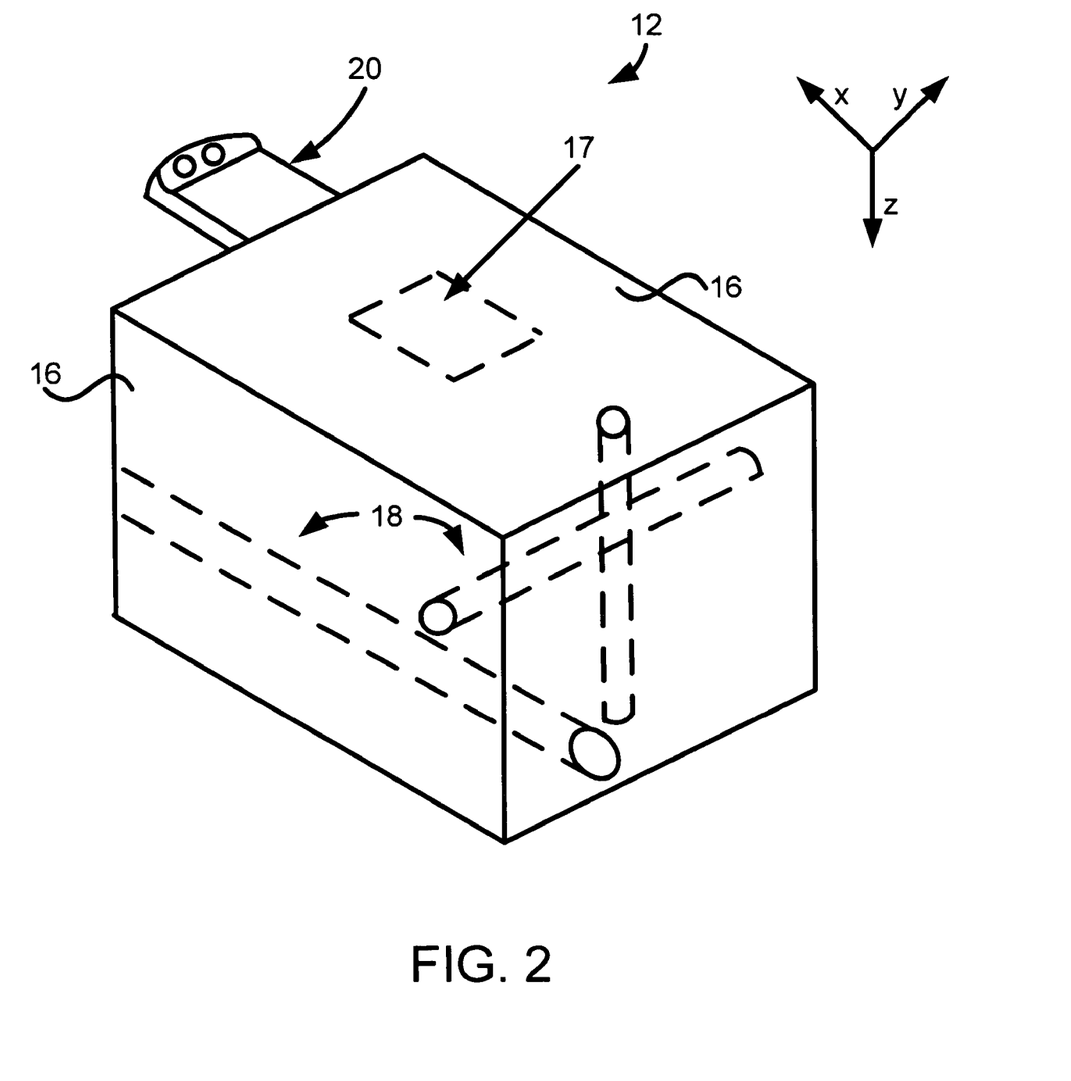
FIG. 2 schematically shows an inertial sensor that may implement a sensor calibration system according to illustrative embodiments of the invention.

FIG. 2 schematically shows a simplified view of an inertial sensor 12 that may implement a sensor calibration system according to illustrative embodiments of the invention. The inertial sensor 12 includes a body 16 having an inertial sensor device 17 (e.g., a MEMS gyroscope or accelerometer, shown in phantom) and a mounting system 18 for mounting the sensor 12 to a mounting apparatus in the object 10, e.g., an automobile chassis. The inertial sensor 12 also has an interface port 20 for communicating with external electronic devices, e.g., the central computer 14 shown in FIG. 1 and/or the sensor calibration system discussed in more detail below. The interface port 20 has the mechanical coupling structure for coupling with a wiring harness, and one or more leads (not shown) to electrically communicate with the external electronic devices. The inertial sensor 12 produces an output value, i.e., motion data, related to the detected movement of the object 10, which may be transmitted to the central computer 14 and/or the sensor calibration system through the interface port 20.

Figure 3:
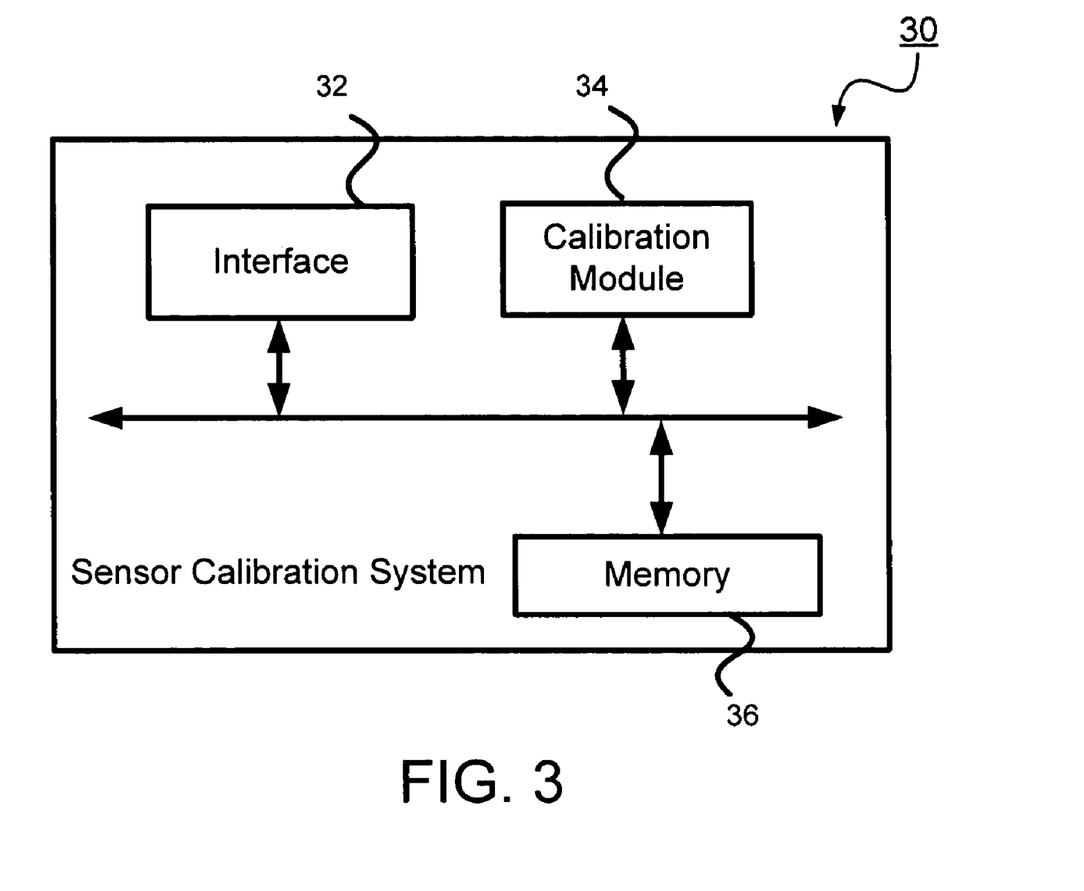
FIG. 3 schematically shows a sensor calibration system in accordance with illustrative embodiments of the invention.

FIG. 3 schematically shows a block diagram of a sensor calibration system in accordance with illustrative embodiments of the invention. The sensor calibration system 30 includes an interface 32 for communicating with external devices, e.g., for receiving sensor output values produced by the inertial sensor 12, and a calibration module 34 for processing the output values received. The sensor calibration system 30 also includes memory 36 for storing or collecting the output values, the prior offset value, and/or a new calculated offset value.

Processing by the calibration module 34 may include calculating an offset value from the output values received. To process the output value from the inertial sensor 12, the calibration module 34 may also have additional functionality as discussed in greater detail below with regard to FIG. 4.

Among other implementations, the calibration module 34 may be a single integrated unit having the discussed functionality, and/or a plurality of interconnected, separate functional devices. Reference to a "module" therefore is for convenience and not intended to limit its implementation. Moreover, the various functionalities within the calibration module 34 may be implemented in any number of ways, such as by means of one or more application specific integrated circuits or digital signal processors. In fact, the discussed functionality may be implemented in software.

As known by those in the art, an offset value generally is the value at the output of the sensor 12 when it is not detecting movement. For example, the offset value may be set to 2.5 volts at fabrication. In various embodiments, circuitry (not shown) determines movement by calculating the difference of the sensor output and the offset voltage. Continuing with the above example, if a gyroscope output reads 3.0 volts, the noted circuitry detects a 0.5 differential between the output and the offset voltage. This 0.5 volts is converted to a movement signal indicating the rotational movement of the object.

Undesirably, over time, the offset voltage often drifts to another value, such as 2.6 volts. Thus, rather than calculating a 0.5 differential value, the noted circuitry may calculate a 0.4 differential value (using the drift value of 2.6 volts) and thus, an inaccurate motion reading. As discussed herein, illustrative embodiments dynamically calibrate the sensor by calculating or approximating the offset voltage at predetermined times in an effort to mitigate the impact of drift on the sensor output.

Figure 4:
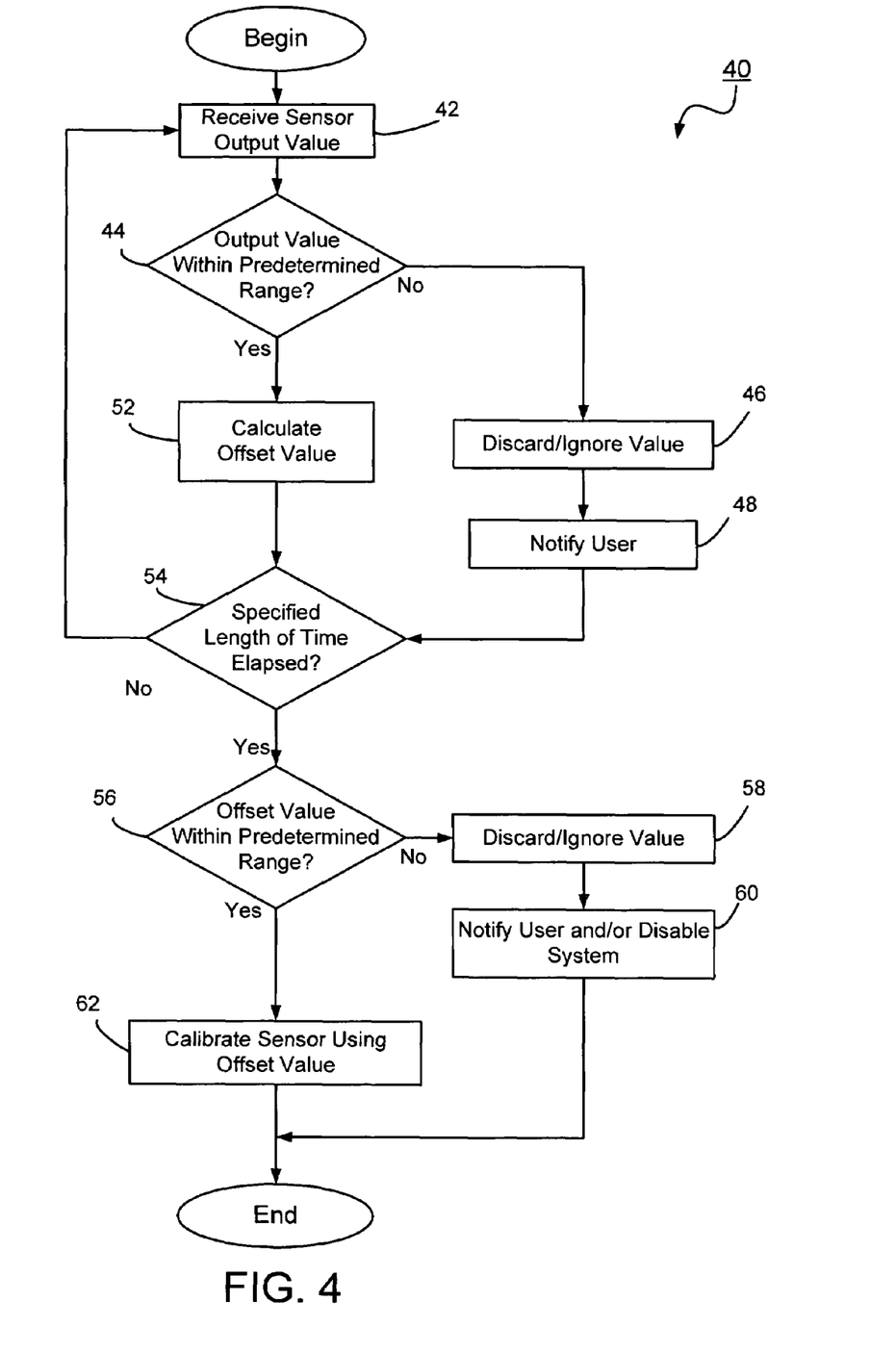
FIG. 4 shows a process of calibrating a sensor system in accordance with illustrative embodiments of the invention.

FIG. 4 shows a process of dynamically calibrating 40 a sensor system in this manner in accordance with illustrative embodiments of the invention. The process begins at step 42 by receiving a sensor output value produced by the inertial sensor 12. The output value may be received from the inertial sensor 12 at a predetermined time. For example, the process may first determine when the object 10 is not moving and then receive output values only during these times. In this case, it is anticipated that the offset value has no component relating to movement. If that is the case, then the output value should be the actual offset value.

In automotive applications, there are a variety of ways to determine when the automobile, and thus its inertial sensor 12, is not moving. For instance, the system may use wheel speed sensors that detect when the wheels are rotating, and/or an accelerometer that may detects road noise. To that end, see, for example, co-pending U.S. patent application Ser. No. 11/418,975, filed May 5, 2006, entitled, "METHOD AND APPARATUS FOR CONTROLLING A PORTABLE DEVICE and assigned to Analog Devices, Inc., the disclosure of which is incorporated herein, in its entirety, by reference. As should be apparent to those skilled in the art, other ways may also be used for detecting when the object 10 is not in motion. Accordingly, the calibration module may include additional functionality that determines when the object 10 is moving and/or not moving.

Alternatively, the process may designate a periodic period of time, e.g., once/hour, in which to receive the output values regardless of whether the object 10 is moving or not. For example, in automotive applications, an automobile is anticipated to make an equal number of right and left turns, or move upwardly an equal number of times as it moves downwardly. Therefore, taking a sampling of the sensor output values at a designated period over time may effectively be similar to receiving an output value when the sensor is not in motion.

A combination of these two modes may also be used. For example, after waiting a designated period of time, the system may use the next output value received after the object 10 is not moving. Alternatively, the process may determine when the object is not moving and then receive the output values while it is not moving after a designated period of time.

In step 44, the process verifies that the received output value is within a predetermined range of values. For example, if the predetermined period of time is selected when the object 10 is not moving, then the received output values should be relatively consistent and the acceptable range of values may be relatively small, e.g., +/−5% of the range of the offset value of the sensor 12. However, if the predetermined period of time is selected at a periodic rate regardless of whether the object 10 is moving or not, then the acceptable range of values may be larger. Thus, the configuration module 34 may include a filter for filtering the received sensor output values. As known by those skilled in the art, the bandwidth of the filter may be selected or configured to determine the range of output values permitted or allowed in the subsequent process.

If the received output value falls outside of the predetermined range, the value is discarded (step 46) and a user may be notified (48). For example, in an automotive application, when the value is outside the predetermined range, the system may light a dash light indicating a problem with the system 12. Alternatively, a user might not be notified until a certain number or percentage of the received output values falls outside of the predetermined range.

If the received output value is within the predetermined range of values, then the process calculates an offset value from the received output value(s) and any prior offset values (e.g., either or both prior calculated offset value(s) and/or actual offset value(s)) (step 52). For example, an average value may be calculated from the received output value and a prior average offset value (i.e., an average of several prior offset values, which generally represents an aggregation of prior offset values). Among other ways, the average value calculated may be a running average of the last N output values received from the inertial sensor 12, such as shown in Equation (1):

$$\text{New } A = A + (OV - A)/N \quad (1)$$

where New A is the new offset value calculated, A is the prior offset value calculated, OV is the sensor output value received, and N is the number of output values used in the calculation. New A, as well as A, thus may be considered a single value, and/or an aggregation of a plurality of output signals.

Step 54 then verifies that a specified length of time has elapsed, or a predetermined number of output values have been averaged or calculated. For example, depending on the kind of sensor used, its environment, and/or its application, the offset value may be collected over weeks or months. If the specified length of time has not elapsed, the process receives another sensor output value from the inertial sensor 12 in step 42.

If the specified length of time has elapsed, or the requisite number of output values has been used in the calculation (e.g., one or more output values), then step 56 compares the calculated new offset value to a predetermined range of values. Thus, the calibration module 32 may include a comparator for verifying that the calculated new offset value is within a certain product specification for the inertial sensor 12. The acceptable amount of deviation may vary depending on the kind of sensor used, its environment and/or its application. In addition, the calibration module 32 may be configurable. For example, among other things, the calibration module 32 may enable a user to configure its operating parameters, such as the predetermined range of values used by the comparator, the bandwidth of the filter, the length of time and/or the period of time.

If the new offset value falls outside of the predetermined range, the offset value is ignored (step 58), and the user may be notified and/or the calibration system may be disabled (step 60). If the calibration system is not disabled at step 60, then the process may select a default calibration value, such as the original factory calibration setting for the sensor null output, for the calibration value to be used with the inertial sensor 12.

Returning to step 56, if the offset value is within the predetermined range of values, then the inertial sensor 12 is calibrated using the new offset value in step 62.

Although calibration of the inertial sensor 12 is discussed in conjunction with the calculation of the offset value, this is not necessarily the case. As will be apparent to those skilled in the art, the offset value may be calculated at some early time, and then the inertial sensor 12 may be calibrated at a later designated time, such as discussed in FIG. 5. For example, the calibration module 34 may load the new offset value into memory 36, such as random access memory (RAM). The calibration module 34 may then transmit the new offset value or calibration value in memory 36 to the inertial sensor via the interface 32. Alternatively, the calibration module 32 may load the calculated offset value into memory 36, but wait until the sensor system and/or the inertial sensor determines when the inertial sensor 12 should be recalibrated with the calibration value.

Calculating the offset value, such as by forming a "running average" of the output value produced by the sensor 12, allows the magnitude of any long-term drift in the sensor 12 to be accumulated in memory 36 and enables the calibration value or offset value used to calibrate the sensor 12 to be correctly modified or recalibrated over time. In addition, vibration or other accidental, random motions should make a much attenuated contribution to the overall long-term average value so that such motions do not compromise the effective recalibration of the sensor and its safe functioning.

Figure 5:
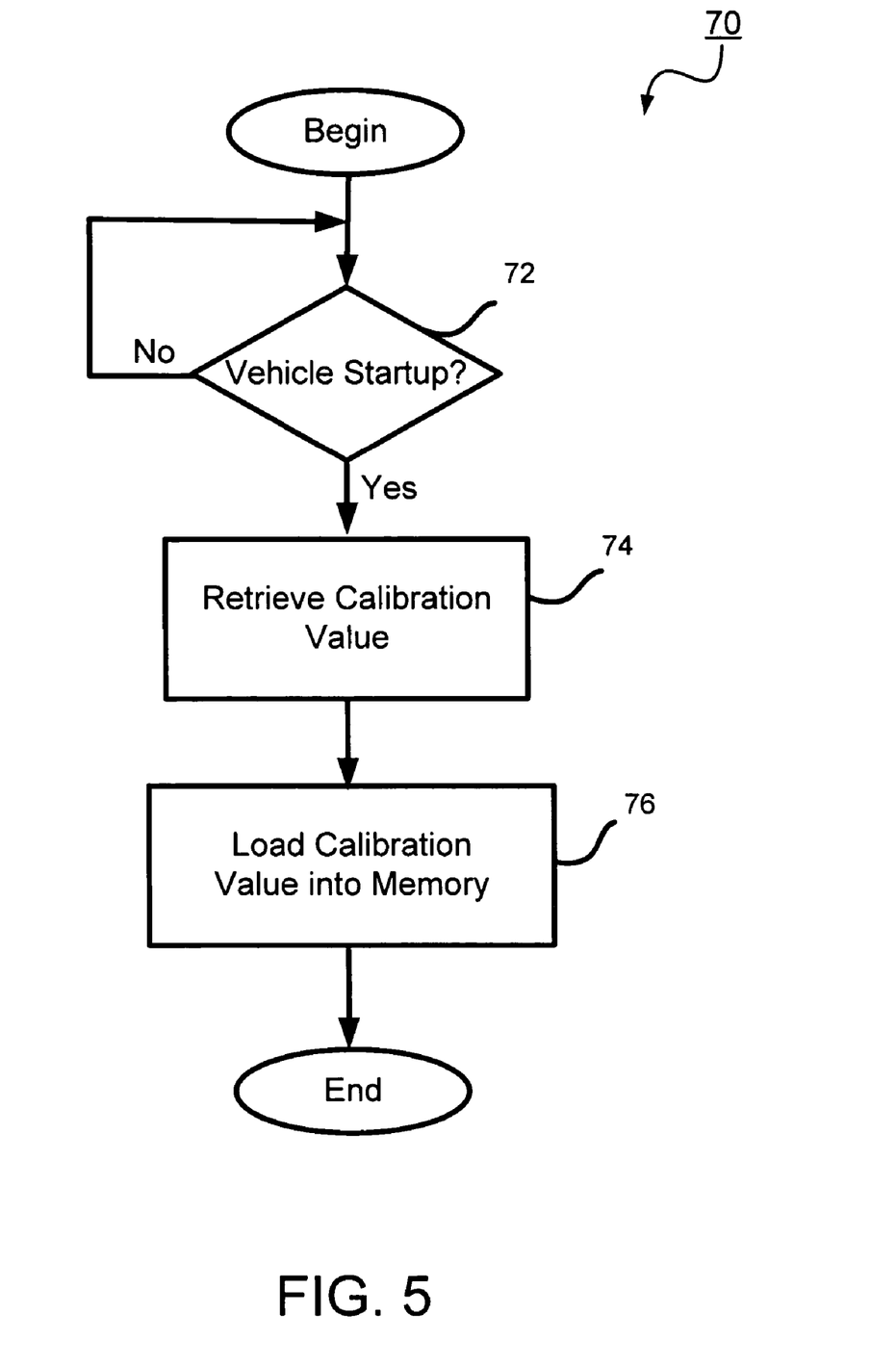
FIG. 5 shows a process of implementing the sensor calibration system in an automobile in accordance with illustrative embodiments of the invention.

FIG. 5 shows a process of implementing 70 the sensor calibration system in an automobile in accordance with illustrative embodiments of the invention. The process may determine a designated period of time for resetting or recalibrating the sensor 12 that may not substantially impact the functioning of the object. Thus, in this embodiment, the process determines when the vehicle is first starting up in step 72. A number of ways may be used to determine when a vehicle is starting up. For example, sensors or other indicators in the engine may be used to determine when the engine is first being turned on or engaged. When the vehicle is started up, the calibration value from the sensor calibration system stored in memory may be retrieved in step 74. In step 76, the calibration value is loaded into memory in the sensor system and subsequently used by the inertial sensor 12 to produce the sensor output values. After calibration, the inertial sensor 12 may complete other initialization processes and/or operate in its intended environment.

Illustrative embodiments may also weigh prior and new offset values. As an example, various embodiments may create a new offset value (also referred to as a "null value") that meets the following requirements:

New null value=(current null reading)*$M$+(last null value)*$N$ where $N+M=1$ and $N>M$ For example, if N equals 0.9 and M equals 0.1, the new null offset value is heavily weighted toward the last null offset value. Of course, other types of averages/weightings may be used. Discussion of the above weighting therefore is illustrative and not intended to limit all embodiments. Accordingly, various other (long-term) drift correction means may be used.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., WiFi, microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A method of processing an offset in a gyroscope having an out put, the gyroscope being in one of a moving state or a non-moving state, the method comprising:
   receiving a sensor output value from the gyroscope;
   receiving a prior offset value;
   calculating a new offset value by averaging, during both states of the gyroscope, the received sensor output value and the prior offset value; and
   calibrating the gyroscope using the new offset value.

2. The method of claim 1, wherein receiving a prior offset value comprises retrieving the prior offset value from a memory device.

3. The method of claim 1, wherein receiving a sensor output value comprises receiving a plurality of sensor output values over a length of time, and wherein calculating a new offset value comprises using the received plurality of sensor output values.

4. The method of claim 3, wherein the plurality of sensor output values are received during a predetermined time, wherein the predetermined time is a periodic period of time.

5. The method of claim 1, further comprising:
   discarding the sensor output value if the sensor output value is outside of a predetermined range of values so that the discarded sensor output value is not used in calculating the new offset value.

6. The method of claim 1, wherein calculating comprises calculating an average using the received sensor output value and the prior offset value.

7. The method of claim 6, wherein calculating an average comprises a weighted average using the received sensor output value and the prior offset value.

8. The method of claim 1, wherein the gyroscope is coupled to an object, the method further comprising:
   notifying a user of the object if the new offset value is outside of a predetermined range of values.

9. The method of claim 1, wherein the gyroscope is coupled to an automobile and calibrating the sensor system occurs at least when the automobile is turned on.

10. A calibration system for a gyroscope, the gyroscope being in one of a moving state or a non-moving state, the system comprising:
    a calibration module for processing an output value produced by the gyroscope the output value related to a detected movement of an object, wherein the calibration module calculates an offset value from a plurality of output values by averaging, during both states of the gyroscope, the output value and the plurality of output values; and
    memory operatively coupled with the calibration module, the memory capable of storing the plurality of output values, the offset value or a combination thereof, wherein the gyroscope is calibrated using the calculated offset value.

11. The calibration system of claim 10, wherein the calibration module further comprises a filter configured to discard the output value if the output value is outside of a predetermined range of values so that the discarded output value is not used in calculating the offset value.

12. The calibration system of claim 10 wherein the calibration module further comprises a comparator to compare the output value from the gyroscope to the offset value stored in the memory.

13. The calibration system of claim 10 wherein the calibration module further comprises a comparator to compare the offset value stored in memory with a default offset value.

14. A computer program product for processing an offset in a gyroscope having an output, the gyroscope being in one of a moving state or a non-moving state, the computer program product comprising a tangible computer usable medium having computer readable program code thereon, the computer readable program code comprising:

program code for receiving a sensor output value from the gyroscope;

program code for receiving a prior offset value;

program code for calculating a new offset value by averaging, during both states of the gyroscope, the received sensor output value and the prior offset value; and program code for calibrating the gyroscope using the new offset value.

15. The computer program product of claim 14, wherein the computer readable program code for receiving a sensor output value further comprises receiving a plurality of sensor output values over a length of time, wherein program code for calculating a new offset value comprises using the received plurality of sensor output values.

16. The computer program product of claim 15, wherein the computer readable program code further comprises:

program code for discarding the sensor output value if the sensor output value is outside of a predetermined range of values so that the discarded sensor output value is not used in calculating the new offset value.

17. The computer program product of claim 14, wherein the gyroscope is coupled to an automobile and program code for calibrating the gyroscope occurs at least when the automobile is turned on.

* * * * *

UNITED STATES PATENT AND TRADEMARK OFFICE
CERTIFICATE OF CORRECTION

PATENT NO. : 7,359,816 B2  
APPLICATION NO. : 11/440495  
DATED : April 15, 2008  
INVENTOR(S) : Vineet Kumar et al.

Page 1 of 1

It is certified that error appears in the above-identified patent and that said Letters Patent is hereby corrected as shown below:

In Col. 8, line 9  
replace "out put"  
with --output--

In Col. 8, line 52  
replace "gyroscope the"  
with --gyroscope, the--

Signed and Sealed this

First Day of July, 2008

JON W. DUDAS  
*Director of the United States Patent and Trademark Office*